United States Patent
Winter et al.

[11] 3,944,010
[45] Mar. 16, 1976

[54] TRACTION-WHEEL MOUNTING WITH ATTACHED DRIVE MOTOR

[75] Inventors: August Winter; Egon Mann, both of Friedrichshafen; Michael Meyerle, Lochbrucke, all of Germany

[73] Assignee: Zahnradfabrik Friedrichshafen AG, Friedrichshafen, Germany

[22] Filed: Oct. 15, 1974

[21] Appl. No.: 514,805

[30] Foreign Application Priority Data
Oct. 16, 1973  Germany............................ 2351834

[52] U.S. Cl................ 180/55; 180/66 R; 180/70 R
[51] Int. Cl.²........................................ B60K 17/08
[58] Field of Search ............ 180/65 R, 65 F, 55, 56, 180/62, 63, 70 R, 66 R

[56] References Cited
UNITED STATES PATENTS

| 735,370 | 8/1903 | Hassler............................ 180/65 R X |
| 2,027,218 | 1/1936 | Armington......................... 180/60 X |

FOREIGN PATENTS OR APPLICATIONS

| 67,987 | 2/1915 | Switzerland......................... 180/56 |
| 83,622 | 5/1920 | Switzerland......................... 180/62 |

*Primary Examiner*—M. H. Wood, Jr.
*Assistant Examiner*—Milton L. Smith
*Attorney, Agent, or Firm*—Karl F. Ross; Herbert Dubno

[57] ABSTRACT

An axle housing which encloses a transmission for the drive of a pair of traction wheels, e.g. as used on a fork-lift truck, has an upper recess flanked by cheeks of enlarged housing extremities which accommodate respective planetary-gear trains. One of the cheeks carries a vertical supporting plate for a hydrostatic drive motor whose shaft enters the axle housing through that cheek and carries a pinion meshing with a toothed ring on a differential-gear housing. The latter housing may be rotatable about a vertical axis through 180° to accommodate motors of different axial length.

6 Claims, 3 Drawing Figures

TRACTION-WHEEL MOUNTING WITH ATTACHED DRIVE MOTOR

FIELD OF THE INVENTION

Our present invention relates to a mounting for a pair of coaxial traction wheels on a vehicle, especially one of the heavy-duty type such as a fork-lift truck.

BACKGROUND OF THE INVENTION

In such vehicles it has already been suggested to power the two traction wheels via a differential gearing, enclosed in an axle housing, from a preferably hydrostatic drive motor carried on that axle housing so as not to encumber other parts of the vehicular frame which must accommodate, in the case of a fork-lift truck, the lifting mechanism as well as a driver's seat in addition to the load. In such prior constructions, however, it was generally necessary to mount the drive motor well above the transverse horizontal axis of the traction wheels in order to find room within the housing for various transmission elements such as speed-reducing planetary-gear trains. The considerable distance of the motor shaft from the wheel axis required the insertion of additional gears between a pinion on the drive shaft of the motor and a driven element in the axle housing, such as a toothed ring of a differential-gear housing.

OBJECT OF THE INVENTION

The object of our present invention, therefore, is to provide a simplified wheel mounting of the general type described above which reduces the distance between motor shaft and wheel axis so as to eliminate the need for intermediate gears and associated bearings.

SUMMARY OF THE INVENTION

This object is realized, pursuant to our present invention, by the use of an axle housing with upwardly enlarged extremities containing respective differential-gear trains, these extremities having confronting cheeks which define between them a recess accommodating the drive motor. With the differential-gear housing installed adjacent one of the planetary-gear trains in one of these extremities, its toothed ring can mesh directly with a coplanar pinion on the motor shaft within that housing extremity.

Advantageously, the cheek of the housing extremity surrounding the drive pinion carries a substantially vertical supporting plate on which the motor is cantilevered within the recess. Part of this motor may extend through the suitably apertured supporting plate and adjoining cheek into the housing extremity, this construction enabling the use of motors whose length almost equals the width of the recess. In fact, pursuant to another feature of our invention, the planetary-gear housing may be alternately emplaceable within the axle housing in two relatively inverted positions, with reference to a vertical plane of symmetry thereof, whereby a toothed ring offset from that plane of symmetry can mesh with the drive pinion at either of two axially spaced locations to enable different positioning of the same drive motor or selective use of a shorter or a longer motor.

BRIEF DESCRIPTION OF THE DRAWING

The above and other features of our invention will now be described in detail with reference to the accompanying drawing in which.

SPECIFIC DESCRIPTION

Figure 1:
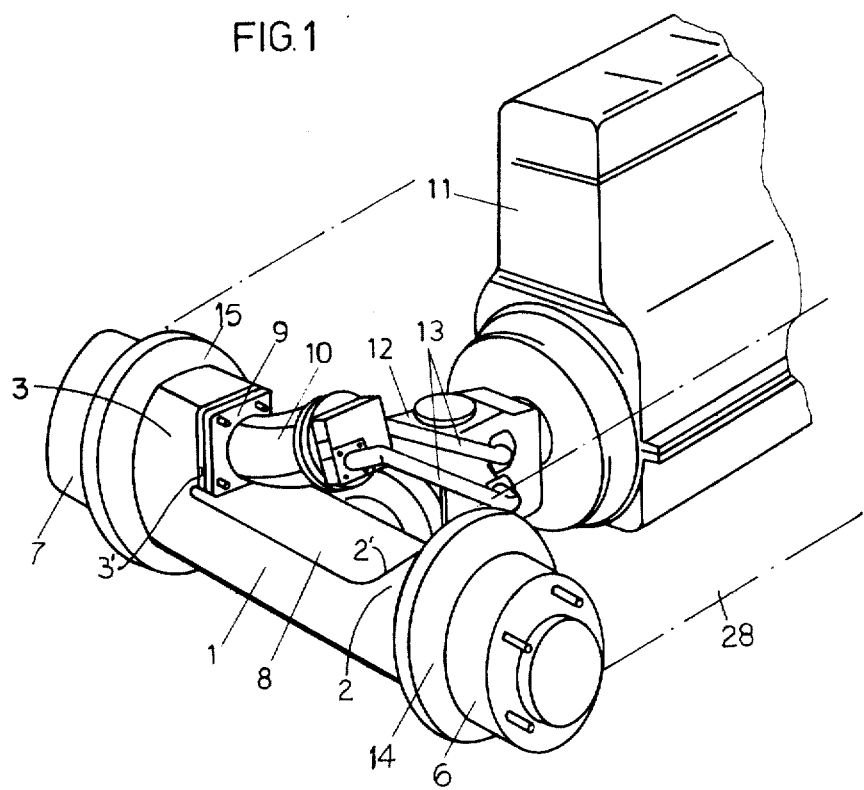
FIG. 1 is a perspective view of an axle housing with associated power unit constructed in accordance with our invention.

In FIG. 1 we have shown a horizontally extending axle housing 1, perpendicular to the direction of locomotion of a vehicle not further illustrated, whose upwardly enlarged extremities 2 and 3 have confronting cheeks 2', 3' defining between them an upper recess 8. Extremities 2 and 3 are secured to respective end disks 14 and 15 which are rigid with the vehicle frame 28, a portion of the outline of that frame having been indicated in phantom lines. Cheek 3' carries a vertical plate 9 which supports a drive motor 10 of the hydrostatic type receiving high-pressure oil from a pump 12 via conduits 13; pump 12 is driven, along with other equipment such as a fork lift, by an internal-combustion engine 11 mounted on frame 28. Two wheel hubs 6 and 7 are rotatably journaled in disks 14 and 15, respectively, and carry respective wheels not shown in FIG. 1 but indicated diagrammatically at 26 and 27 in FIGS. 2 and 3.

Figure 2:
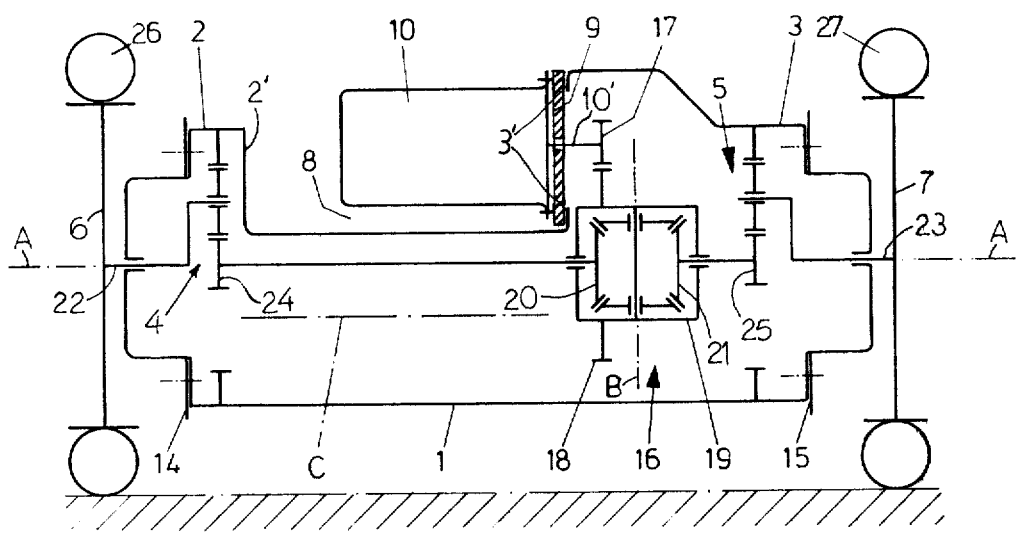
FIG. 2 is a schematic axial sectional view of an axle housing generally similar to that of FIG. 1.
Figure 3:
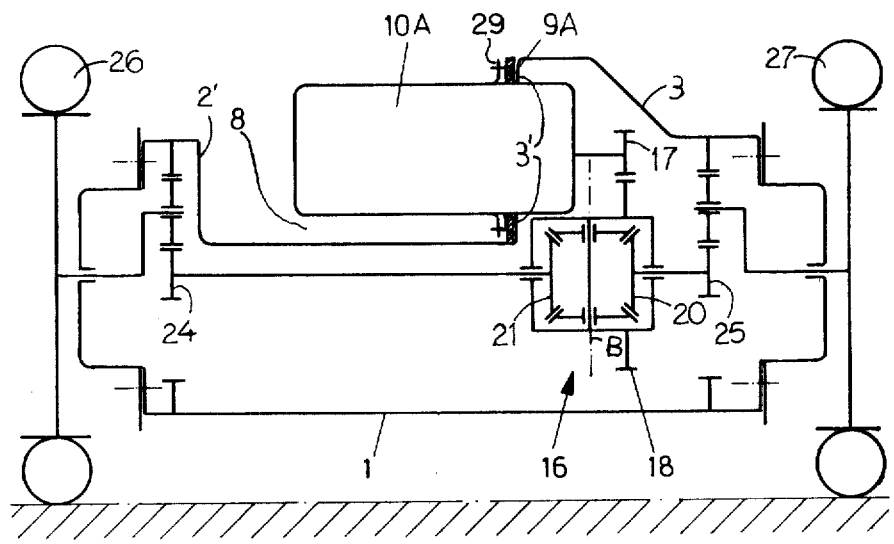
FIG. 3 is a view similar to FIG. 2, illustrating a modification.

Motor 10, cantilevered on plate 9, is shown in FIG. 1 as somewhat inclined to the horizontal as is customary with hydrostatic motors. In FIG. 2, however, this motor has been shown for simplicity as horizontally disposed. In FIGS. 2 and 3, furthermore, the cheek 2' of housing extremity 2 is shown vertical instead of sloping as in FIG. 1.

Wheel hubs 6 and 7 are centered on a horizontal axis A and mounted on output shafts 22 and 23 of the transmission system located within axle housing 1, these shafts being linked with respective planet carriers of a pair of planetary-gear trains 4 and 5 disposed within extremities 2 and 3, respectively. A differential gearing 16 of the bevel-gear type has a housing 19 provided with a toothed ring 18 which in FIG. 2 meshes with a coplanar pinion 17 on a drive shaft 10' of motor 10 and is disposed proximal to the cheek 3' to the left of an axis B which is the projection of a vertical plane of symmetry of gear housing 19, the gear housing being rotatable about axis B between two positions 180° apart as illustrated in FIGS. 2 and 3, respectively. In the position of FIG. 3 the pinion 17 is spaced farther from cheek 3' than in FIG. 2 to enable the use of a larger motor 10A, the right-hand end of this motor extending into housing extremity 3 through a suitable aperture in cheek 3' thereof. Thus, the shorter motor 10 in FIG. 2 is mounted on a supporting plate 9 merely having a central hole for the passage of shaft 10', whereas in FIG. 3 a frame-shaped supporting plate 9A is used to give passage to the body of motor 10A and is fastened to a peripheral flange 29 of the motor axially spaced from its right-hand end. Otherwise, the structures of FIGS. 2 and 3 are identical.

Planetary-gear trains 4 and 5 have respective sun gears 24 and 25 linked in FIG. 2 with corresponding sun gears 20 and 21 in differential-gear housing 19; in FIG. 3 this connection is reversed. Except for pinion 17 and the planet gears of trains 4, 5 and 16, all the gears in axle housing 1 are centered on the axis A of wheel hubs 6 and 7 which lies within that housing somewhat above the centerline C of its reduced intermediate portion underneath recess 8. The short distance between axis A and motor shaft 10' eliminates the need for any intermediate gearing between pinion 17 and toothed ring 18 which lie in a common vertical plane perpendicular to axis A.

We claim:

1. A mounting for a pair of vehicular traction wheels, comprising:
    a horizontally extending axle housing having upwardly enlarged extremities with a pair of confronting cheeks defining a recess between them;
    transmission means inside said housing including a pair of planetary-gear trains in said extremities and a differential gearing adjacent one of said planetary-gear trains in one of said extremities, said differential gearing having a gear housing provided with a toothed ring;
    a drive motor carried on said one of said extremities within said recess and provided with a substantially horizontal drive shaft at one end and with a peripheral flange axially spaced from said one end, the cheek of said one of said extremities being fastened to said flange and being provided with an aperture through which said one end extends into said one of said extremities together with said drive shaft;
    a pinion on said drive shaft meshing with said toothed ring within said one of said extremities;
    a pair of wheel hubs adjacent said extremities centered on a horizontal axis which passes through said axle housing below said recess; and
    a pair of output shafts, journaled in said extremities in line with said axis, linking said wheel hubs with said planetary-gear trains.

2. A mounting as defined in claim 1 wherein said gear housing is alternately emplaceable in said axle housing in two relatively inverted positions with reference to a vertical plane of symmetry thereof, said toothed ring being offset from said plane of symmetry for meshing with said pinion at either of two axially spaced locations enabling different positioning of said drive motor in said recess.

3. A mounting as defined in claim 1 wherein said planetary-gear trains, said differential gearing and said toothed ring are centered on said horizontal axis.

4. A mounting as defined in claim 3 wherein said toothed ring and said pinion lie in a common vertical plane transverse to said horizontal axis.

5. A mounting as defined in claim 3 wherein an intermediate portion of said axle housing, between said extremities, has a centerline at a level below said horizontal axis.

6. A mounting for a pair of vehicular traction wheels, comprising:
    a horizontally extending axle housing having upwardly enlarged extremities with a pair of confronting cheeks defining a recess between them;
    transmission means inside said housing including a pair of planetary-gear trains in said extremities and a differential gearing adjacent one of said planetary-gear trains in one of said extremities, said differential gearing having a gear housing provided with a toothed ring;
    a drive motor carried on said one of said extremities within said recess and provided with a substantially horizontal drive shaft;
    a pinion on said drive shaft meshing with said toothed ring within said one of said extremities;
    a pair of wheel hubs adjacent said extremities centered on a horizontal axis which passes through said axle housing below said recess; and
    a pair of output shafts, journaled in said extremities in line with said axis, linking said wheel hubs with said planetary-gear trains;
    the cheek of said one of said extremities having an opening large enough to receive an end portion of said drive motor, said gear housing being alternately emplaceable in said axle housing in two relatively inverted positions with reference to a vertical plane of symmetry thereof, said toothed ring being offset from said plane of symmetry for meshing with said pinion at either of two axially spaced locations enabling different positioning of said drive motor in said recess.

* * * * *